F. O. Rogers,
Elevated Garden.
No. 101,918.  Patented Apr. 12, 1870.
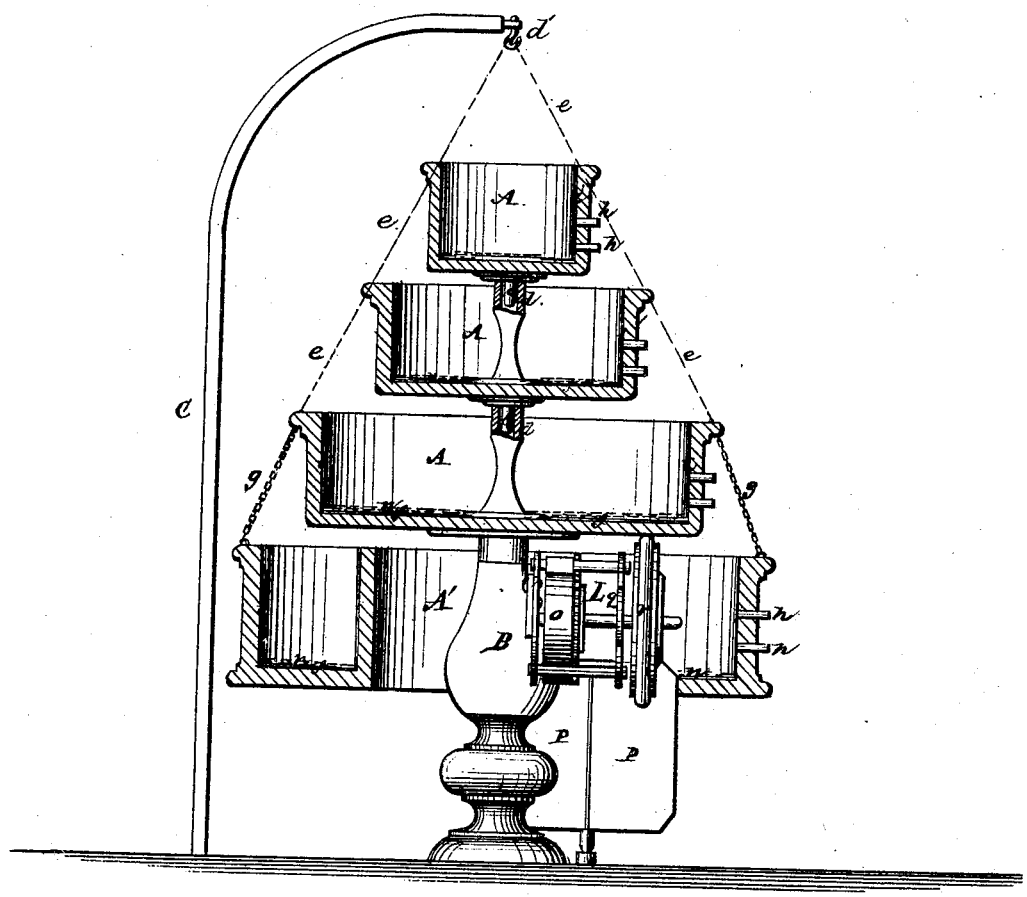
Witnesses:
Inventor:
F. O. Rogers

United States Patent Office.

FREDERICK O. ROGERS, OF BOSTON, MASSACHUSETTS.

Letters Patent No. 101,918, dated April 12, 1870.

IMPROVEMENT IN ELEVATED AND SUSPENDED GARDENS.

The Schedule referred to in these Letters Patent and making part of the same.

I, FREDERICK O. ROGERS, of Boston, in the county of Suffolk and State of Massachusetts, have invented certain new and useful Improvements in Elevated and Suspended Gardens, of which the following is a specification.

My invention is designed for the growth and culture of flowers, ornamental plants, and other vegetation in gardens elevated above the surface of the ground, whereby they may be made to appear more ornamental and attractive, and limited space utilized; and The invention consists in the manner of constructing and arranging suspended or elevated gardens composed of one or more receptacles for containing the earth and plants, and in so connecting two or more, that each revolves independently of the other; in the combination therewith of a device for revolving one or more of the receptacles automatically; and in the manner of constructing the interior with composition coating and metallic lining combined, and so applied as to preserve the wood or other material used in their construction, and to retain the soil in a moist condition, all as hereinafter described.

The drawing represents my improvement with the receptacles A in section, the standard B in elevation, and a like view of a supporting-bracket C, with dotted lines showing the suspending-rods or chains $e\ e$, used to support the receptacles when the standard B is not employed.

L represents the clock-work, of which $o$ is the spring motor, $p\ p$ the regulating fly, $q$-the gearing, and $r$ the friction-wheel which imparts motion to the receptacles A A A.

In the drawing, A A A A' are receptacles for the soil and plants, of circular and annular form and graduated sizes, arranged in a pyramidal form upon the central standard B, or suspended from any suitable support, as a frame-work or the branch of a tree. When supported on a standard, each receptacle is provided with a central bearing-pivot, $c$, which rests loosely in a corresponding socket, $d$, formed in the top of the standard for the lower one of the series, and in the bottom of each successive one of those above. By this means each one of the series may be revolved independently of the others, for the purpose of bringing the different kinds of plants into more favorable situations for light or observation, or for the arrangement and grouping of colors to please the taste.

When the receptacles are suspended from a support above, they are hung by chains or rods $e\ e$, which are provided with a swivel on which they may be turned in like manner.

The bottom of the receptacles, which are preferably made of wood, though other material may be used, is covered with a layer of felt, $f$, preparatory to receiving the cement, and a lining of zinc, tin, or other suitable sheet metal is applied at the sides, (as shown at $i\ i$ in the accompanying drawing,) the lower edges of which project inwardly upon the bottom far enough to overlap the felt, and be covered by the water-proof coating, which may consist of any bituminous cement or compound, such as is usually employed for covering roofs. This is spread evenly over the bottom surface, as represented at $n\ n$ in the drawings, and by this mode of forming the connection between the metallic and composition portions of the lining, a permanent water-tight joint is secured.

I have found bituminous roofing compounds peculiarly adapted to this purpose, as their use involves the application of the principles of the preservation of these substances, which is the subject of Letters Patent No. 79,601, granted to me July 7, 1868, from which I quote the following language as applicable to this part of my specification:

"I have discovered that the want of durability of the cement is due to the heat of the sun acting upon the bituminous ingredients, under the influence of dryness of the atmosphere and of the roof itself.

"The melting heat of the summer's sun dissipates the volatile portions of the bituminous or other pitch, by evaporation, and the oily portions, or such as become fluid under solar heat, are absorbed by the felt, boards, or other underlying porous substances, aided by capillary attraction.

"This process, continued for some time, deprives the composition of its softness and pliability, and it becomes rigid and brittle, fracturing under its contraction at cold temperatures, and leakage results, necessitating a renewal of the composition or cement.

"By maintaining a condition in which moisture and protection from the intense heat of the sun's rays are combined, the bituminous parts of these compounds will be retained for a great length of time, insuring elasticity sufficient to enable ordinary expansion and contraction to take place without cracking, and keep the pores closed and the material impervious to moisture."

When the standard B is employed, I provide on the bottom of the lower receptacle A, a bearing or pivot, $c$, which rests in a corresponding socket, $d$, formed in the top of the standard B. When suspended from the support above described, I prefer to employ a swivel, $d'$, which turns in its bearing so as to allow the receptacle to be revolved, as in the other case, and to the swivel $d'$ are attached cords or chains $e\ e$, which connect with the receptacle A, and by which it is suspended.

In addition to the described series of receptacles, one or more may be suspended underneath the others, as at A', by means of connecting cords or chains $g\ g$,